(12) United States Patent
Han et al.

(10) Patent No.: US 8,797,728 B2
(45) Date of Patent: Aug. 5, 2014

(54) DISPLAY APPARATUS

(75) Inventors: Sang Hoon Han, Suwon-si (KR); Kwang Hyun Lee, Seoul (KR); Yoon Seok Baek, Sangju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 352 days.

(21) Appl. No.: 13/336,354

(22) Filed: Dec. 23, 2011

(65) Prior Publication Data

US 2012/0162949 A1 Jun. 28, 2012

(30) Foreign Application Priority Data

Dec. 24, 2010 (KR) .......................... 10-2010-0134781

(51) Int. Cl.
G06F 1/16 (2006.01)
A47B 81/00 (2006.01)
F16M 11/06 (2006.01)
F16M 11/10 (2006.01)

(52) U.S. Cl.
CPC .............. G06F 1/1601 (2013.01); F16M 11/06 (2013.01); F16M 11/10 (2013.01); Y10S 248/917 (2013.01); Y10S 248/922 (2013.01); Y10S 248/923 (2013.01)
USPC .............. 361/679.21; 361/679.22; 312/223.1; 312/223.2; 248/917; 248/922; 248/923

(58) Field of Classification Search
CPC ... G06F 1/1601; G06F 1/1605; G06F 1/1607; F16M 11/06; F16M 11/08; F16M 11/10; F16M 11/12

USPC ............ 361/679.01–679.45, 679.55–679.59; 248/917–924; 312/223.1, 223.2; 345/156, 157, 168, 169, 905

See application file for complete search history.

(56) References Cited

U.S. PATENT DOCUMENTS

| | | | |
|---|---|---|---|
| 6,268,998 B1 * | 7/2001 | Cho | 361/679.23 |
| 6,912,120 B2 * | 6/2005 | Kim et al. | 361/679.06 |
| 7,267,312 B2 * | 9/2007 | Kang et al. | 248/291.1 |
| 7,268,999 B2 * | 9/2007 | Kim | 361/679.27 |
| 7,274,557 B2 * | 9/2007 | North et al. | 361/679.27 |
| 2004/0211866 A1 * | 10/2004 | Jung et al. | 248/133 |
| 2005/0248912 A1 * | 11/2005 | Kang et al. | 361/681 |
| 2006/0203436 A1 * | 9/2006 | Hwang et al. | 361/679 |
| 2007/0206124 A1 * | 9/2007 | Lee | 348/836 |
| 2010/0149734 A1 * | 6/2010 | Sakata et al. | 361/679.01 |

* cited by examiner

Primary Examiner — Nidhi Desai
(74) Attorney, Agent, or Firm — Sughrue Mion, PLLC (57) ABSTRACT

Provided herein is a display apparatus including a hinge having a coupling part coupled to a panel and a body part connected to the coupling part, a stand neck coupled to the body part, a main base having a fixing part, to which the hinge and the stand neck are fixed, a main board including a power board and a signal board connected to each other so as to form a two-layer stacked structure so that the power board and the signal board are mounted in a space of the main base as a single module, and a cover assembly including a middle cover to accommodate the main base, the middle cover being provided with a mounting part corresponding to the fixing part.

20 Claims, 11 Drawing Sheets

DISPLAY APPARATUS

CROSS-REFERENCE TO RELATED APPLICATION

This application claims priority from Korean Patent Application No. 2010-0134781, filed on Dec. 24, 2010 in the Korean Intellectual Property Office, the disclosure of which is incorporated herein by reference.

BACKGROUND

1. Field

Apparatuses consistent with exemplary embodiments relate to a display apparatus having a slim and compact structure.

2. Description of the Related Art

A display apparatus displays an image on a screen. Representative examples of a display apparatus may include a television (TV) and a computer monitor.

Generally, the display apparatus includes a cover defining the external appearance thereof, a panel mounted in the cover to display an image, and a circuit board on which electric components to drive and control the panel are disposed.

In recent years, with the improvement in quality of display apparatuses, companies have begun to focus more on consumer demand in addition to basic functions thereof.

Such consumer demand relates to consumer satisfaction and aesthetics. To this end, a display apparatus is manufactured so that the display apparatus provides an aesthetically pleasing appearance and has a slim and compact structure.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a hinge comprising a coupling part which is coupled to a rear of a panel and a body part rotatably connected to the coupling part; a stand neck which is coupled to the body part of the hinge and accommodates the body part of the hinge;

a main base comprising a fixing part which fixes the hinge and the stand neck, wherein the main base has a space defined therein; a main board comprising a power board and a signal board which are connected to each other in a two-layer stacked structure wherein the main board is mounted in the space of the main base; and a cover assembly comprising a middle cover which accommodates the main base and comprises a mounting part corresponding to the fixing part of the main base, an upper cover coupled to a top of the middle cover and a lower cover coupled to a bottom of the middle cover.

The body part of the hinge may be mounted in the stand neck and fixed to the fixing part of the main base together with the stand neck by a screw.

The display apparatus may further include a stand neck cover coupled to the stand neck.

The main base may weigh more than the panel, and a center of gravity of the display apparatus is in the main base.

The display apparatus may further include a fan mounted in the space of the main base, wherein the fan discharges heat in the main base.

The fan may be mounted in the space of the main base and fixed to the main base by a screw.

The hinge, the stand neck, the middle cover of the cover assembly and the fixing part of the main base may each be provided with a through hole through which heat in the main base is discharged by the fan.

The main board may be mounted within the main base and wherein the stand neck includes a jack, and one end of the main board is connected to the jack, and another end of the main board is mounted in the main base.

The main board may be fixed to the main base by a screw.

The upper cover of the cover assembly may include a function key.

The upper cover of the cover assembly may be coupled to the middle cover of the cover assembly and the upper cover intersects the main board mounted in the space of the main base at a predetermined angle.

The display apparatus may further include a function keyboard mounted between the middle cover and the upper cover of the cover assembly, wherein the function keyboard is attached to the upper cover.

The function keyboard may be attached to the upper cover of the cover assembly by adhesive tape.

According to an aspect of an exemplary embodiment there is provided display apparatus which may include: a panel; a hinge comprising a coupling part, which is coupled to a rear of the panel and has a first through hole, and a body part, which is rotatably connected to the coupling part; a low-voltage differential signaling (LVDS) cable which extends through the first through of the coupling part and is configured to transmit a signal to the panel; a stand neck which accommodates the body part of the hinge, and has a second through hole through which the LVDS cable extends; a stand neck cover which is coupled to the stand neck; a main base comprising a fixing part which fixes the hinge and the stand neck, wherein the fixing part includes a space through which the LVDS cable extends; a main board comprising a power board and a signal board connected to each other in a two-layer stacked structure wherein the main board is mounted in the space in the main base, and the LVDS cable is connected to the main board; a cover assembly comprising a middle cover comprising a mounting part corresponding to the fixing part of the main base, an upper cover coupled to a top of the middle cover and a lower cover coupled to a bottom of the middle cover; and a function keyboard which is mounted between the middle cover and the upper cover of the cover assembly, wherein the function keyboard is attached to the upper cover.

The LVDS cable, may extend through the first through hole via the body part of the hinge.

The stand neck may accommodate at least one jack which is connectable to at least one of a power cable and a signal cable.

The stand neck cover may further include an opening through which at least one of a power cable and a signal cable extend.

The power board and the signal board of the main board may be connected via a cable.

A power cable and a signal cable may be connected to the power board and the signal board, respectively.

The main base may include a fan, and the fan is connected to the power board of the main board via a cable.

The function keyboard may be connected to the power board of the main board via a cable.

A lower part of the stand neck may comprise a jack.

The power board and the signal board may be connected to each other via a support bar.

A display apparatus having a display panel, wherein the display apparatus may include: a hinge including a coupling part and a body part, wherein the coupling part couples to the display panel and the body part is rotatably connected to the coupling part; a stand neck which accommodates the body part of the hinge and accommodates at least one jack; a main base which couples to the hinge and the stand neck and which includes a space; a main board which includes a power supply circuit and a signal circuit, wherein the power supply is operable to supply power to the display panel and the signal circuit is operable to supply a display signal to the display panel, wherein the power supply circuit and the signal circuit are connectable to the at least one jack accommodated by the stand neck, and wherein the main board is mounted in the space of the main base; and a cover assembly which accommodates the main base.

The hinge may further include a through hole which accommodates a low-voltage differential signaling (LVDS) cable, wherein the LVDS cable is operable to transmit the display signal to the display panel.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Reference will now be made in detail to the exemplary embodiments, examples of which are illustrated in the accompanying drawings, wherein like reference numerals refer to like elements throughout.

Figure 1:
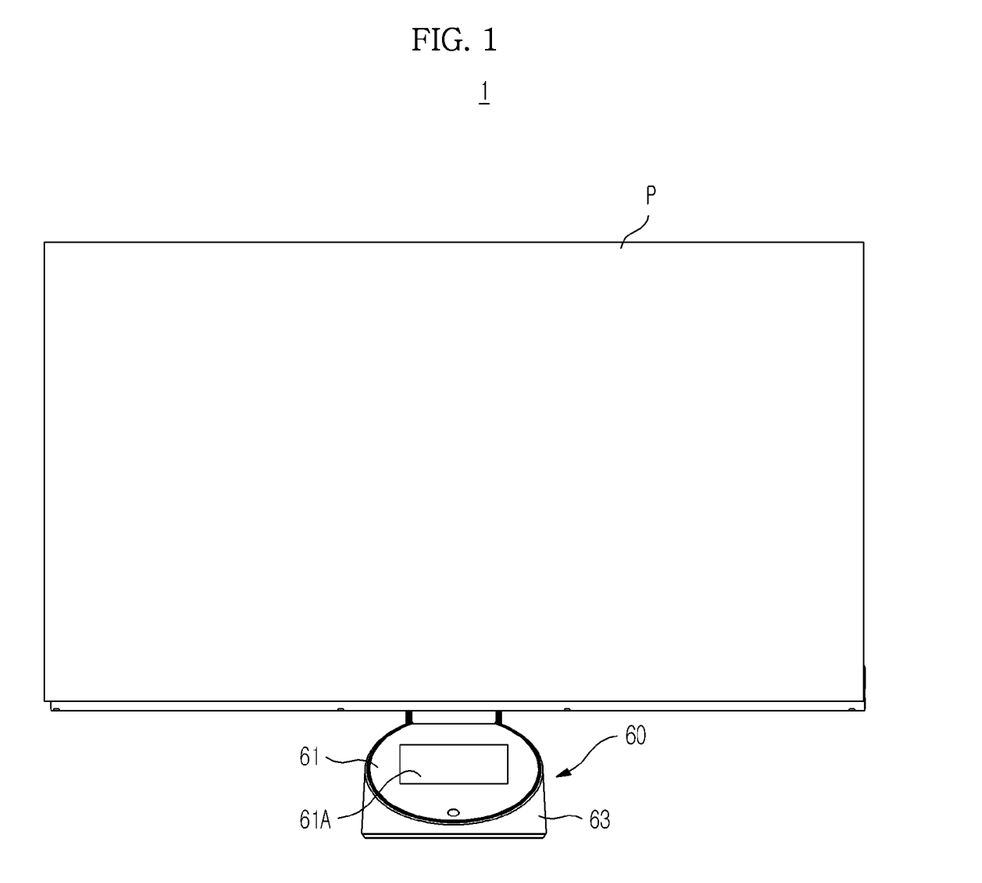
FIG. 1 is a front view illustrating a display apparatus according to an exemplary embodiment.
Figure 2:
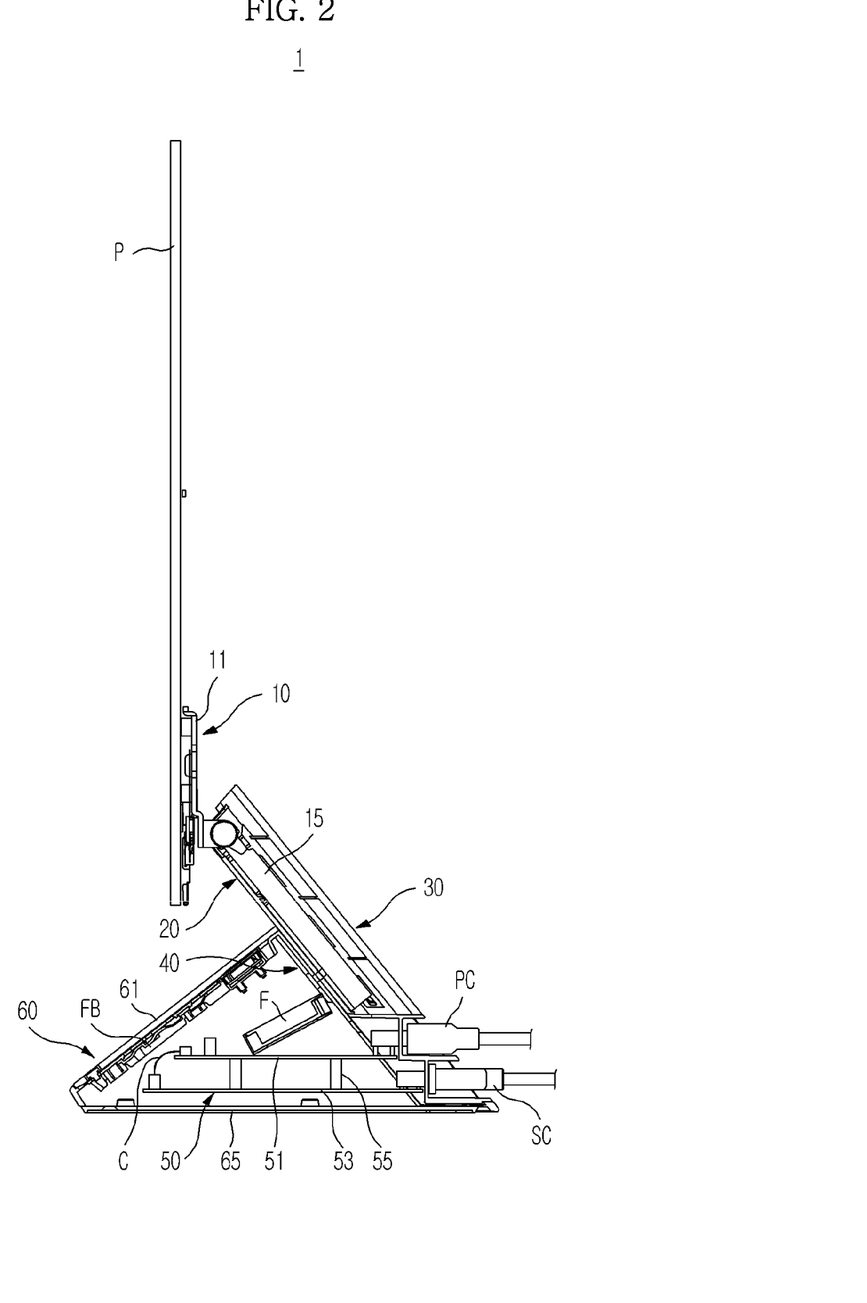
FIG. 2 is a side sectional view of the display apparatus according to the exemplary embodiment.
Figure 3:
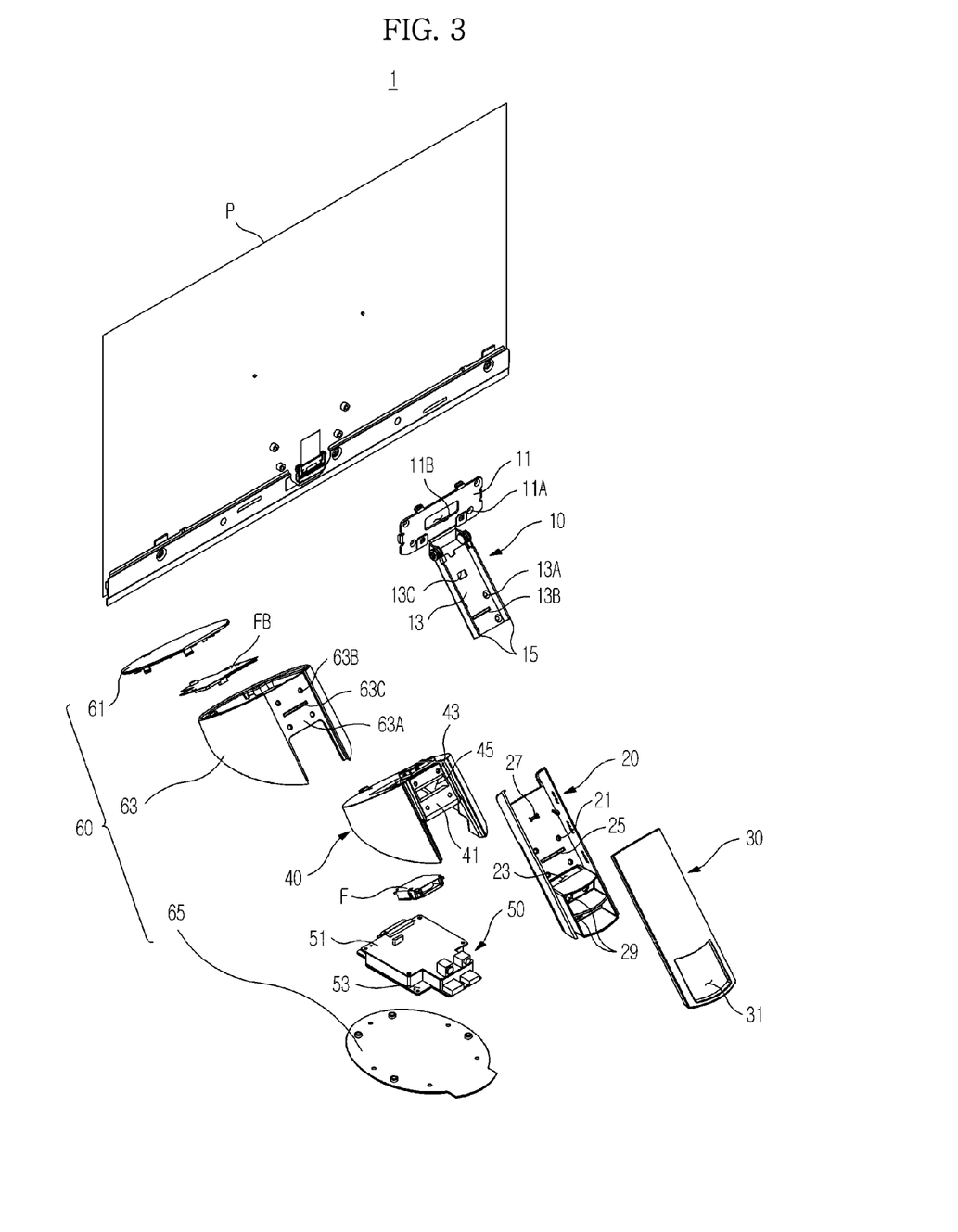
FIG. 3 is an exploded perspective view of the display apparatus according to the exemplary embodiment.

FIG. 1 is a front view illustrating a display apparatus according to an exemplary embodiment, FIG. 2 is a side sectional view of the display apparatus according to the exemplary embodiment, and FIG. 3 is an exploded perspective view of the display apparatus according to the exemplary embodiment.

As shown in FIGS. 1 to 3, a display apparatus 1 includes a hinge 10 coupled to a panel P so that the panel P is vertically rotatable, a stand neck 20 to accommodate a portion of the hinge 10 below the hinge 10, a stand neck cover 30 coupled to the stand neck 20 above the stand neck 20, a main base 40 to which the hinge 10 and the stand neck 20 are coupled, the main base 40 having a space, in which components are mounted, defined therein, a main board 50 mounted in the space of the main base 40 to control power supply and signal transmission, a fan F mounted in the space of the main base 40, a cover assembly 60 to accommodate the main base 40, and a function keyboard FB to control a function key 61A formed at the cover assembly 60.

As shown in FIG. 2, the hinge 10 is coupled to the panel P so that the panel P is vertically rotatable.

Figure 4:
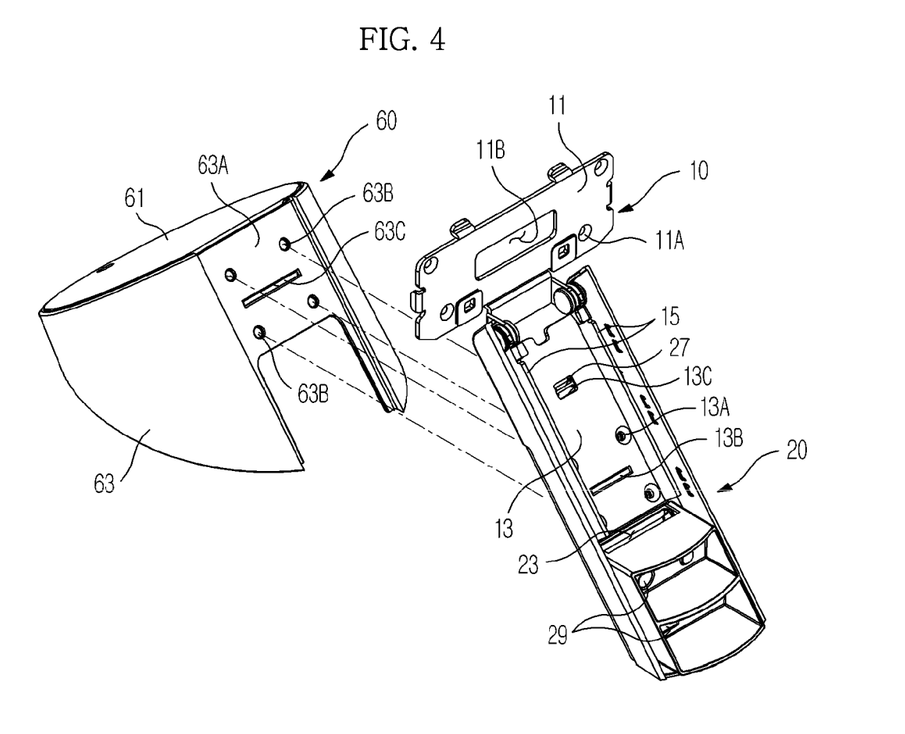
FIG. 4 is a view illustrating a state in which a hinge and a stand neck according to an exemplary embodiment are fixed to a middle cover of a cover assembly.

As shown in FIGS. 3 and 4, the hinge 10 includes a coupling part 11 coupled to the lower end of the rear of the panel P and a body part 13 connected to the coupling part 11 so that the coupling part 11 is rotatable.

Fixing holes 11A for panel fixing are formed at the coupling part 11 of the hinge 10. The hinge 10 is fixed to the panel P by inserting screws through the fixing holes 11A.

As shown in FIGS. 3 to 6 and 10, a through hole 11B, through which a low-voltage differential signaling (LVDS) cable LC to interconnect the panel P and the main board 50 extends, is formed at the coupling part 11 of the hinge 10.

The LVDS cable LC has one end connected to the main board 50, and extends through the through hole 11B formed at the coupling part 11 of the hinge 10 so that the other end of the LVDS cable LC is connected to the panel P. Power is supplied and a signal is transmitted to the panel P from the main board 50 via the LVDS cable LC.

The coupling part 11 of the hinge 10 is vertically rotatably coupled to the body part 13 of the hinge 10. Consequently, the panel P coupled to the coupling part 11 of the hinge 10 is vertically rotatable.

Fixing holes 13A for main base fixing are formed at the body part 13 of the hinge 10. The body part 13 of the hinge 10 is fixed to the main base 40 by inserting screws through the fixing holes 13A.

Protrusion parts 15 are formed at left and right edges of the body part 13 of the hinge 10 so that the protrusion parts 15 protrude upward to define a space in the body part 13. The LVDS cable LC extends through the through hole 11B formed at the coupling part 11 of the hinge 10 via the space defined in the body part 13 by the protrusion parts 15.

Figure 7:
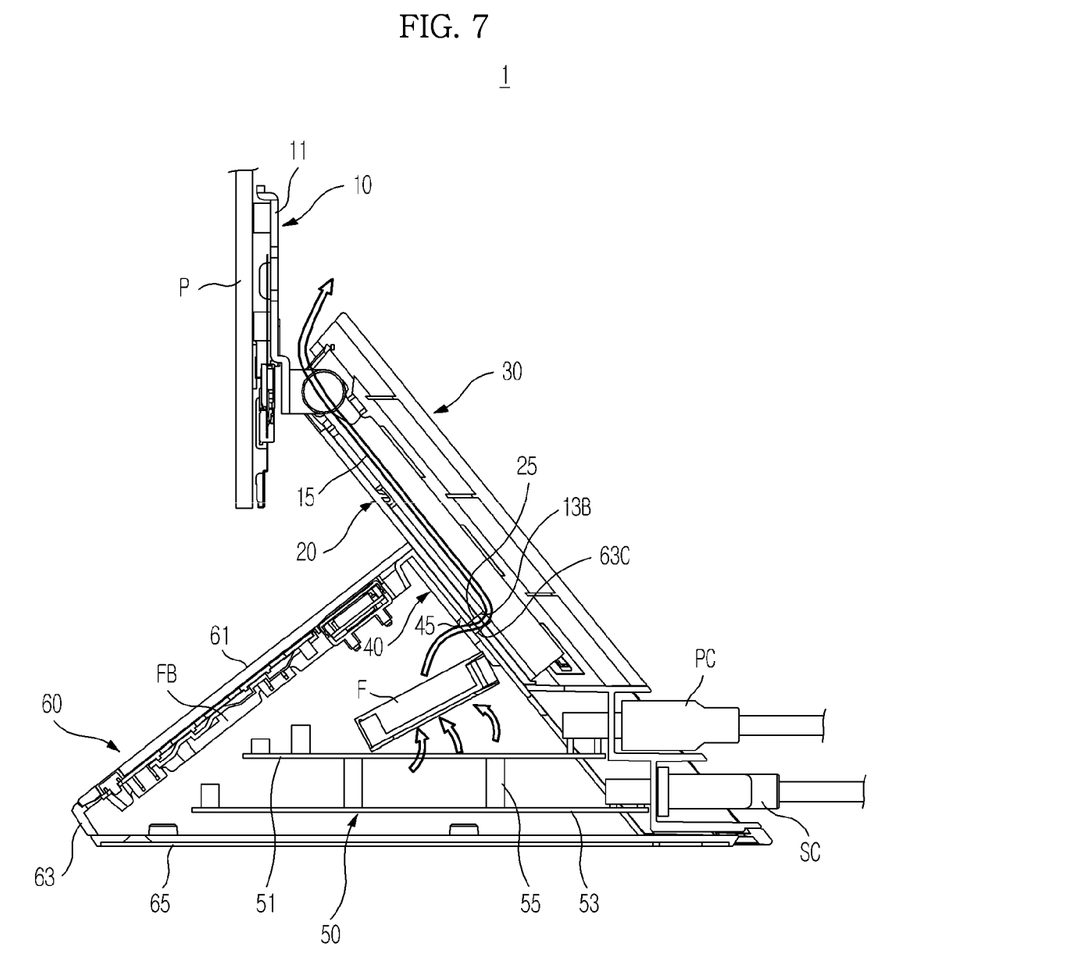
FIG. 7 is a view illustrating a state in which heat in a main base is discharged to the outside by a fan according to an exemplary embodiment.

As shown in FIGS. 3, 4 and 7, a through hole 13B is formed at the body part 13 of the hinge 10 to provide a channel through which heat in the main base 40 is discharged to the outside by the fan F mounted in the main base 40.

Also, a coupling hole 13C is formed at the body part 13 of the hinge 10. When the body part 13 of the hinge 10 is coupled to the stand neck 20, a coupling protrusion 27 formed at the stand neck 20 is fitted into the coupling hole 13C formed at the body part 13 of the hinge 10.

As shown in FIGS. 3 and 4, the stand neck 20 is coupled to the body part 13 of the hinge 10 below the body part 13 of the hinge 10 so that the body part 13 of the hinge 10 is accommodated in the stand neck 20.

Fixing holes 21 for main base fixing are formed at the stand neck 20. The stand neck 20 is fixed to the main base 40 by inserting screws through the fixing holes 21.

When the body part 13 of the hinge 10 is accommodated in the stand neck 20, the stand neck 20 and the body part 13 of the hinge 10 are fixed to the main base 40 in a state in which the fixing holes 21 formed at the stand neck 20 are aligned with the fixing holes 13A formed at the body part 13 of the hinge 10.

As shown in FIGS. 3 to 7 and 10, a through hole 23 is formed at the stand neck 20 in the same manner as the coupling part 11 of the hinge 10. After extending through the through hole 23 of the stand neck 20, the LVDS cable LC extends through the through holes 11B formed at the coupling part 11 of the hinge 10 via the main body 13 of the hinge 10 so that the LVDS cable LC is connected to the panel P.

Also, a through hole 25 is formed at the stand neck 20 to provide a channel through which heat in the main base 40 is discharged to the outside by the fan F mounted in the main base 40.

When the body part 13 of the hinge 10 is accommodated in the stand neck 20, the through hole 25 formed at the stand neck 20 is aligned with the through hole 13B formed at the body part 13 of the hinge 10 so that heat in the main base 40 is smoothly discharged to the outside.

The coupling protrusion 27 is formed at the stand neck 20. When the stand neck is coupled to the body part 13 of the hinge 10, the coupling protrusion 27 of the stand neck 20 is fitted into the coupling hole 13C formed at the body part 13 of the hinge 10.

Jacks 29, to which a power cable PC and a signal cable SC are connected, are formed at the lower part of the stand neck 20. The power cable PC and the signal cable SC, connected to the jacks 29 formed at the stand neck 20, are connected to a power board 51 and a signal board 53 of the main board 50 mounted in the space of the main base 40, respectively.

As shown in FIGS. 2 to 5, the stand neck cover 30 is coupled to the stand neck 20 above the stand neck 20 to define the external appearance thereof and to prevent the LVDS cable LC extending through the main body 13 of the hinge 10 accommodated in the stand neck 20 from being exposed to the outside.

An opening 31, through which the power cable PC and the signal cable SC extend so as to be connected to the jacks 29 formed at the stand neck 20, is formed at the lower part of the stand neck cover 30.

As shown in FIGS. 2 to 7, a space, in which the fan F and the main board 50 are mounted, is defined in the main base 40.

A size of the main base 40 is as small as possible so that the display apparatus 1 is simple in design and pleasing in appearance. Also, the main base 40 is manufactured to be as heavy as possible so as to prevent the panel P from shaking from side to side. Consequently, the main base 40 defines the center of gravity of the display apparatus 1.

Figure 5:
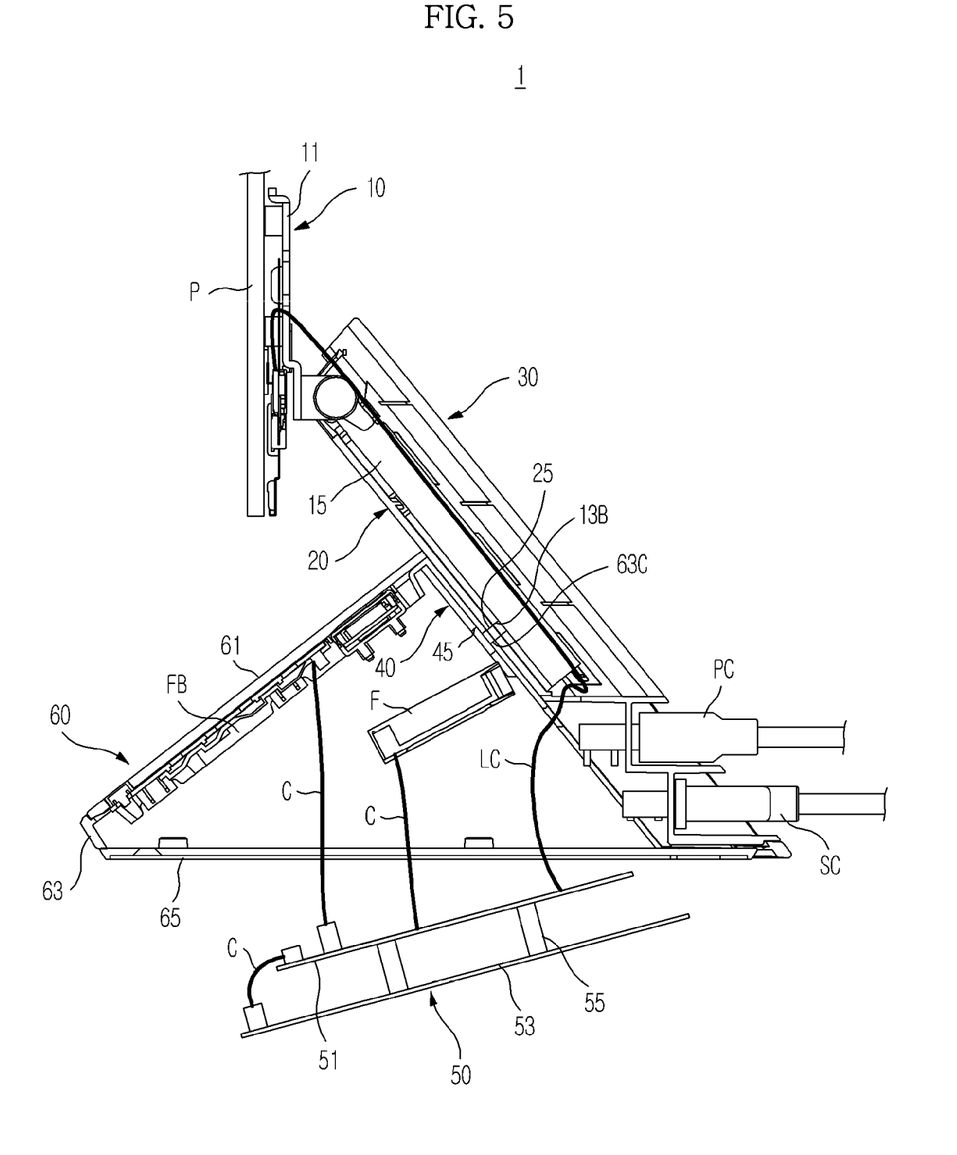
FIG. 5 is a side sectional view illustrating the connection between cables according to an exemplary embodiment.
Figure 6:
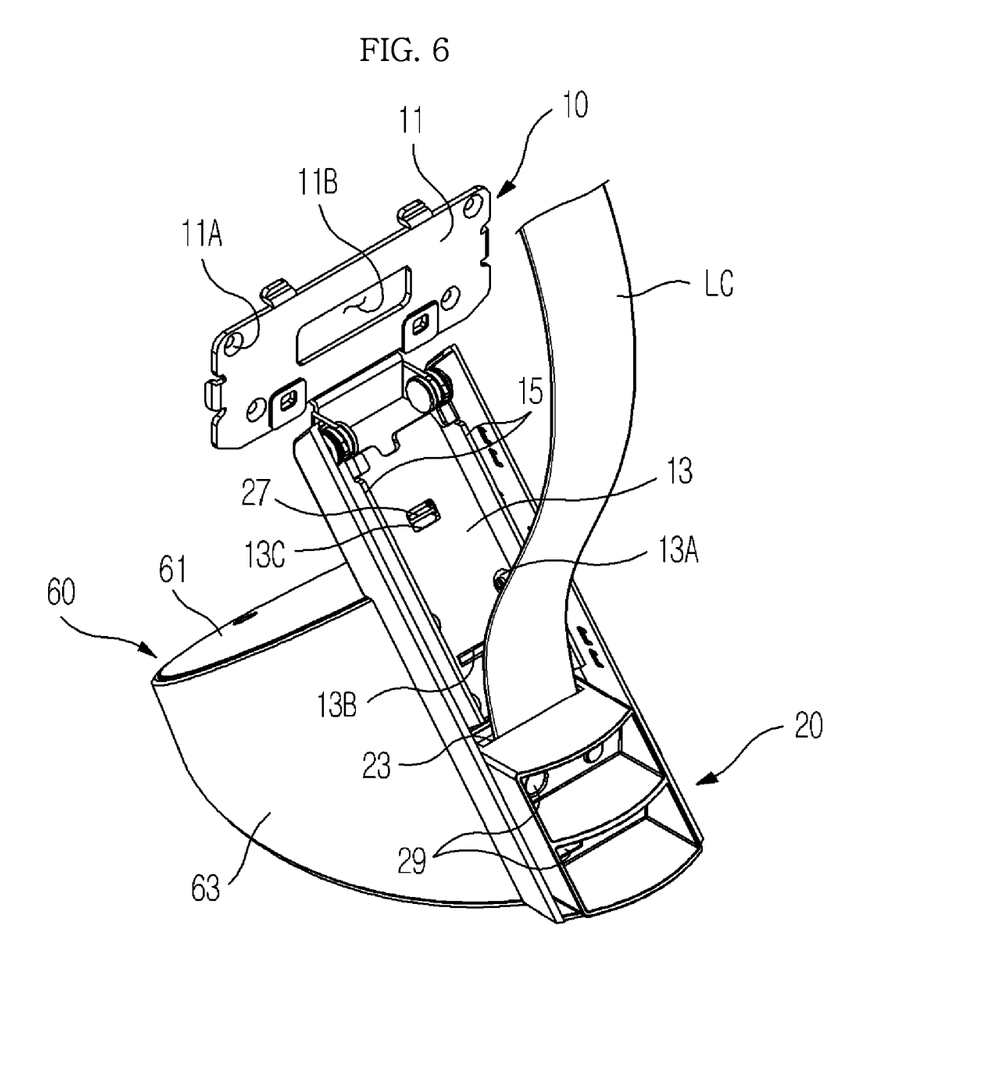
FIG. 6 is a view illustrating the connection of a low-voltage differential signaling (LVDS) cable according to an exemplary embodiment.

As shown in FIGS. 3 and 5, a fixing part 41, to which the body part 13 of the hinge 10 and the stand neck 20 are fixed, is formed at the main base 40. Fixing holes 43 are formed at the fixing part 41 of the main base 40. The body part 13 of the hinge 10 and the stand neck 20 are fixed to the main base 40 by screws in a state in which the fixing holes 13A formed at the body part 13 of the hinge 10, the fixing holes 21 formed at the stand neck 20 and the fixing holes 43 formed at the fixing part 41 of the main base 40 are aligned with each other.

Also, an empty space, through which the LVDS cable LC extends to interconnect the main board 50 and the panel P, is defined at the lower part of the fixing part 41 of the main base 40.

As shown in FIGS. 3 to 7 and 10, the fan F, which discharges heat in the main base 40 to the outside, is mounted in the space defined in the main base 40.

The fan F is mounted in the space of the main base 40 and is then fixed to the main base 40 by screws.

The fan F is connected to the power board 51 of the main board 50 mounted in the space of the main base 40 via a cable C.

A through hole 45, through which heat in the main base 40 is discharged to the outside by the fan F, is formed at the main base 40.

As shown in FIGS. 2 to 9, the main board 50, including the power board 51 and the signal board 53, is mounted in the main base 40.

A size of the main base 40 is as small as possible, and therefore, the internal space of the main base is small.

Figure 8:
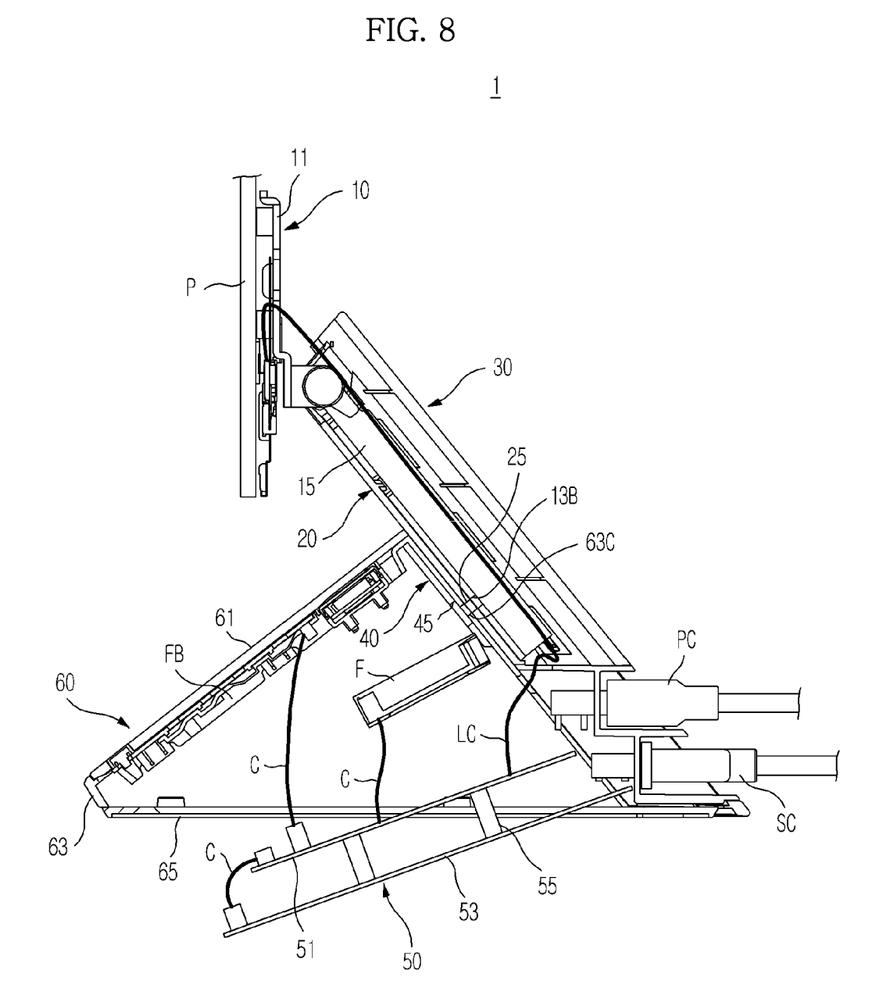
FIGS. 8 and 9 are views illustrating a state in which a main board according to an exemplary embodiment is fixed to the main base.
Figure 9:
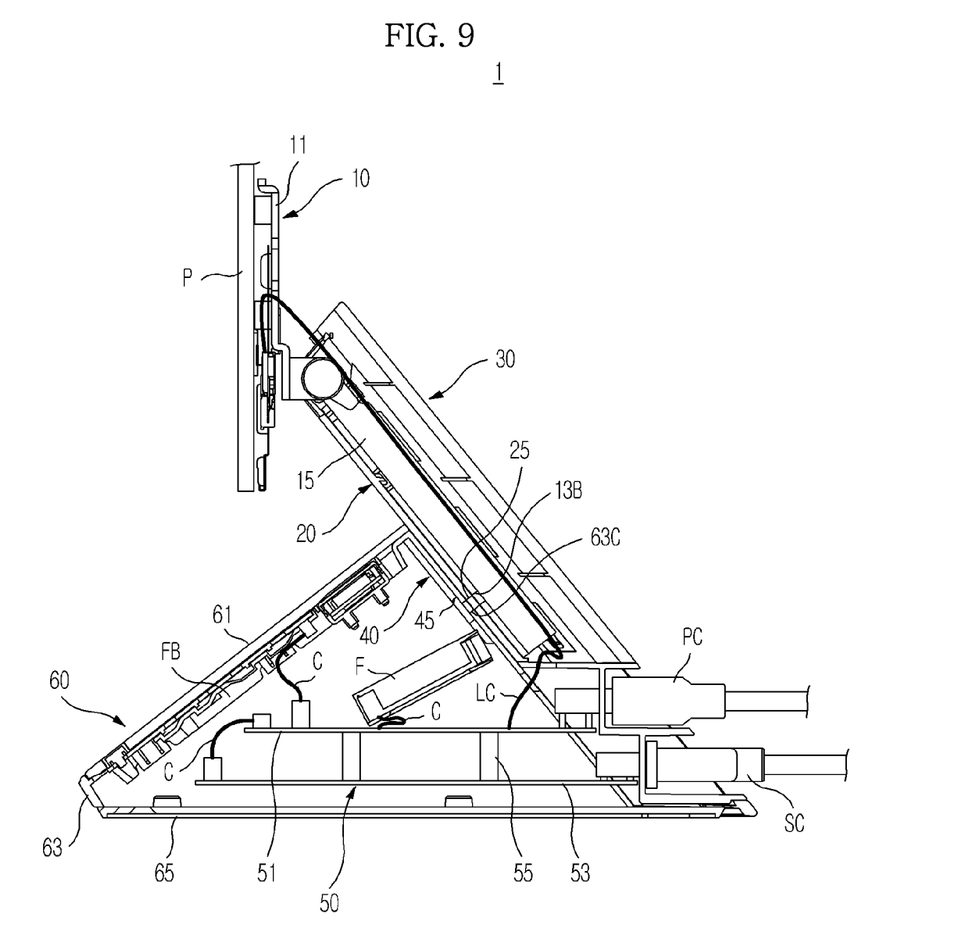
Figure 10:
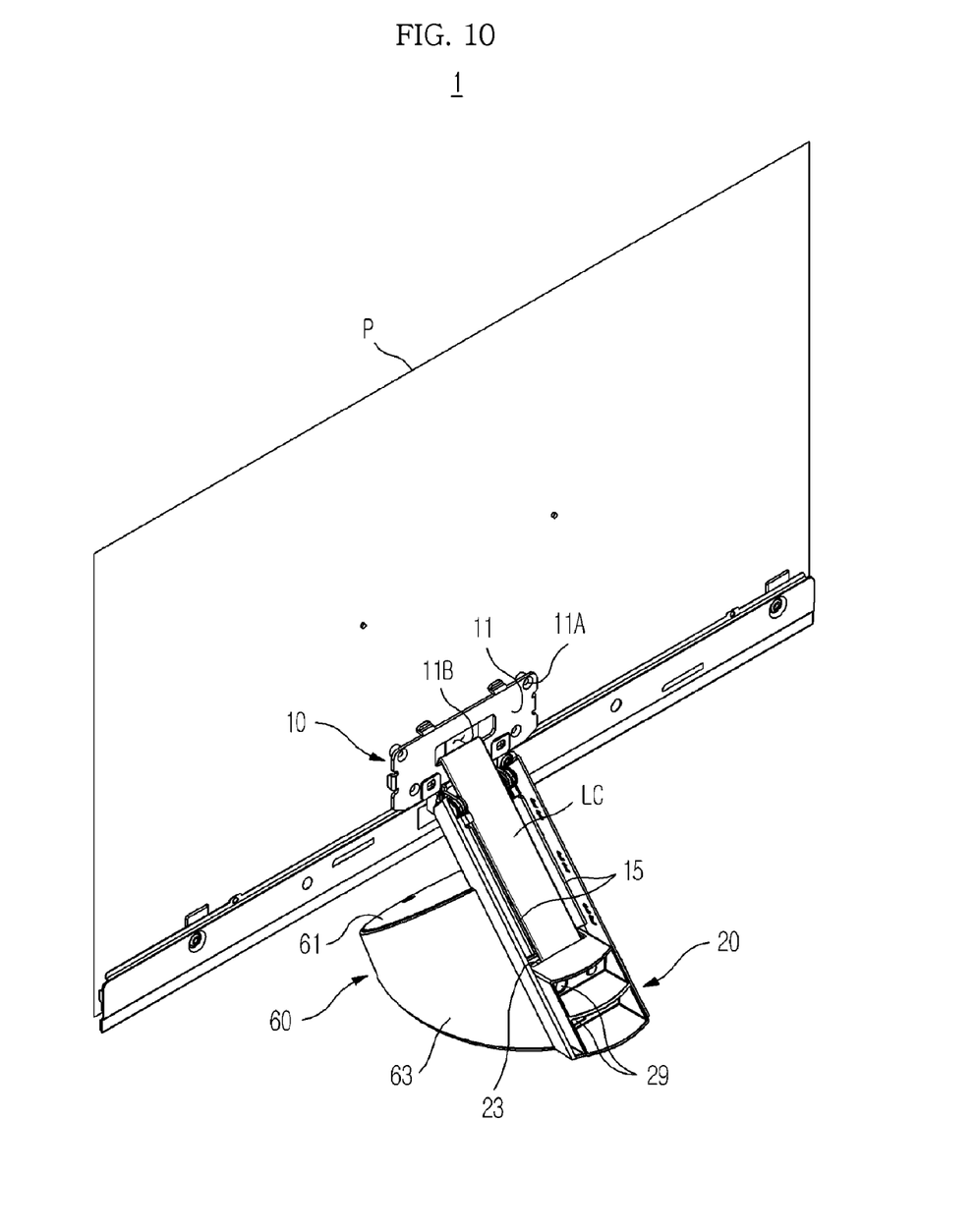
FIG. 10 is a rear perspective view illustrating a state in which the LVDS cable according to the exemplary embodiment is connected to a panel.

To mount the main board 50 in the small internal space of the main base 40, the power board 51 and the signal board 53 are connected to each other via support bars 55 so as to form a two-layer stacked structure in which the power board 51 and the signal board 53 are stacked while the support bars 55 are disposed between the power board 51 and the signal board 53. Consequently, the power board 51 and the signal board 53 are mounted in the space of the main base 40 as a single module.

The power board 51 and the signal board 53 connected to each other via the support bars 55 to form the two-layer stacked structure are electrically connected to each other via a cable C.

Also, the power board 51 of the main board 50 is connected to the fan F mounted in the space of the main base 40 via a cable C and is connected to the panel P via the LVDS cable LC.

The LVDS cable LC connected to the power board 51 of the main board 50 extends through the through hole 23 of the stand neck 20 via the space defined in the lower part of the fixing part 41 of the main base 40 and extends through the through hole 11B formed at the coupling part 11 of the hinge 10 via the body part 13 of the hinge 10 so that the LVDS cable LC is connected to the panel P.

The main board 50 is connected to the panel P via the LVDS cable LC to supply power and transmit a signal to the panel P.

As shown in FIGS. 7 to 9, the main board 50 is pushed into the main base 40 so that one end of the main board 50 is connected to the jacks 29 of the stand neck 20 through the space defined in the lower part of the fixing part 41 of the main base 40, and then the other end of the main board 50 is rotated upward so as to be mounted in the main base 40.

The main board 50 mounted in the main base 40 is fixed to the main base 40 by screws.

As shown in FIGS. 2, 3 and 5 to 7, the cover assembly 60 includes an upper cover 61, a middle cover 63 and a lower cover 65.

The middle cover 63 of the cover assembly 60 is coupled to the main base 40 above the main base 40 to accommodate the main base 40.

A mounting part 63A corresponding to the fixing part 41 of the main base 40 is formed at the middle cover 63 coupled to the main base 40. Fixing holes 63B are formed at the mounting part 63A of the middle cover 63 in the same manner as the fixing part 41 of the main base 40. When the middle cover 63 is coupled to the main base 40, the fixing holes 43 formed at the fixing part 41 of the main base 40 are aligned with the fixing holes 63B formed at the mounting part 63A of the middle cover 63.

When the body part 13 of the hinge 10 and the stand neck 20 are fixed to the main base 40, therefore, the fixing holes 13A formed at the body part 13 of the hinge 10, the fixing holes 21 formed at the stand neck 20, the fixing holes 63B formed at the mounting part 63A of the middle cover 63 of the cover assembly 60 and the fixing holes 43 formed at the fixing part 41 of the main base 40 are aligned with each other.

Screws are inserted through the fixing holes 13A, 21, 63B and 43, which are aligned with each other so that the body part 13 of the hinge 10 and the stand neck 20 are fixed to the main base 40.

An empty space, through which the LVDS cable LC to interconnect the main board 50 and the panel P extends, is defined at the lower part of the mounting part 63A formed at the middle cover 63 of the cover assembly 60.

A through hole 63C to provide a channel through which heat in the main base 40 is discharged to the outside in the same manner as the main base 40, the body part 13 of the hinge and the stand neck 20 is formed at the middle cover 63 of the cover assembly 60 coupled to the main base 40 to accommodate the main base 40.

The upper cover 61 of the cover assembly 60 is coupled to the top of the middle cover 63 of the cover assembly 60.

A function key 61A is formed at the outside of the upper cover 61. The function key 61A may be formed to have a touch type structure.

The upper cover 61 of the cover assembly 60, at which the function key 61A is formed, is coupled to the middle cover 53 of the cover assembly 60 so that the upper cover 61 intersects the main board 50 mounted in the space of the main base 40 at a predetermined angle. Using this structure, a user may easily manipulate the function key 61A.

Also, a speaker (not shown) may be further provided at the upper cover 61.

Figure 11:
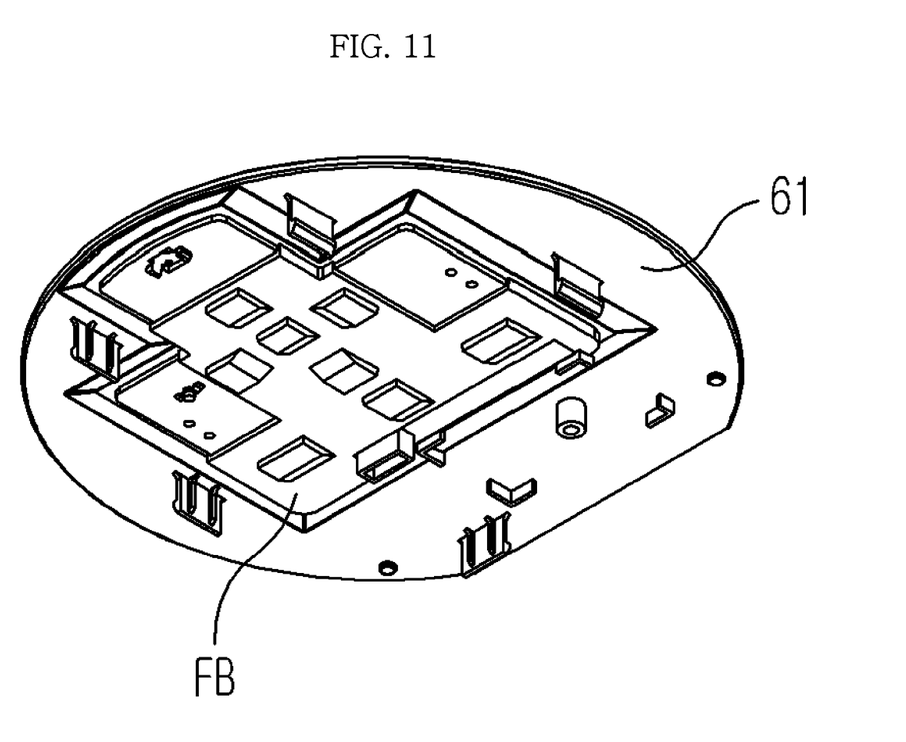
FIG. 11 is a view illustrating a state in which a function keyboard is assembled to an upper cover of a cover assembly according to an exemplary embodiment.

As shown in FIG. 11, a function keyboard FB is mounted between the upper cover 61 and the middle cover 63 of the cover assembly 60 to control the function key 61A formed at the upper cover 61.

The function keyboard FB is attached to the upper cover 61 of the cover assembly 60 by double-sided adhesive tape.

The function keyboard FB attached to the upper cover 61 of the cover assembly 60 is connected to the power board 51 of the main board 50 via a cable C.

The lower cover 65 of the cover assembly 60 is coupled to the bottom of the middle cover 65.

As is apparent from the above description, the main board is mounted in the stand. Consequently, the panel has a compact and slim structure.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display apparatus comprising: a hinge comprising a coupling part which is coupled to a rear of a panel and a body part rotatably connected to the coupling part; a stand neck which is coupled to the body part of the hinge and accommodates the body part of the hinge; a main base comprising a fixing part which fixes the hinge and the stand neck, wherein the main base has a space defined therein; a main board comprising a power board and a signal board which are connected to each other via a support bar so as to form a multi-layer stacked structure wherein the main board is mounted in the space of the main base; and a cover assembly comprising a middle cover which accommodates the main base and comprises a mounting part corresponding to the fixing part of the main base, an upper cover coupled to a top of the middle cover and a lower cover coupled to a bottom of the middle cover; wherein the main board is mounted within the main base and wherein the stand neck includes a jack, and one end of the main board is connected to the jack, and another end of the main board is mounted in the main base.

2. The display apparatus according to claim 1, wherein the body part of the hinge is mounted in the stand neck and fixed to the fixing part of the main base together with the stand neck by a screw.

3. The display apparatus according to claim 1, further comprising a stand neck cover coupled to the stand neck.

4. The display apparatus according to claim 1, wherein the main base weighs more than the panel, and a center of gravity of the display apparatus is in the main base.

5. The display apparatus according to claim 4, further comprising a fan mounted in the space of the main base, wherein the fan discharges heat in the main base.

6. The display apparatus according to claim 1, wherein the fan is mounted in the space of the main base and fixed to the main base by a screw.

7. The display apparatus according to claim 6, wherein the hinge, the stand neck, the middle cover of the cover assembly and the fixing part of the main base are each provided with a through hole through which heat in the main base is discharged by the fan.

8. The display apparatus according to claim 1, wherein the main board is fixed to the main base by a screw.

9. The display apparatus according to claim 1, wherein the upper cover of the cover assembly includes a function key.

10. The display apparatus according to claim 9, wherein the upper cover of the cover assembly is coupled to the middle cover of the cover assembly and the upper cover intersects the main board mounted in the space of the main base at a predetermined angle.

11. The display apparatus according to claim 10, further comprising a function keyboard mounted between the middle cover and the upper cover of the cover assembly, wherein the function keyboard is attached to the upper cover.

12. The display apparatus according to claim 11, wherein the function keyboard is attached to the upper cover of the cover assembly by adhesive tape.

13. The display apparatus according to claim 1, wherein a lower part of the stand neck comprises a jack.

14. A display apparatus comprising: a panel; a hinge comprising a coupling part, which is coupled to a rear of the panel and has a first through hole, and a body part, which is rotatably connected to the coupling part; a low-voltage differential signaling (LVDS) cable which extends through the first through hole of the coupling part and is configured to transmit a signal to the panel; a stand neck which accommodates the body part of the hinge, and has a second through hole through which the LVDS cable extends; a stand neck cover which is coupled to the stand neck; a main base comprising a fixing part which fixes the hinge and the stand neck, wherein the fixing part includes a space through which the LVDS cable extends; a main board comprising a power board and a signal board connected to each other in a multi-layer stacked structure wherein the main board is mounted in the space in the main base, and the LVDS cable is connected to the main board; a cover assembly comprising a middle cover comprising a mounting part corresponding to the fixing part of the main base, an upper cover coupled to a top of the middle cover and a lower cover coupled to a bottom of the middle cover; and a function keyboard which is mounted between the middle cover and the upper cover of the cover assembly, wherein the function keyboard is attached to the upper cover; wherein the stand neck accommodates at least one jack which is connectable to at least one of a power cable and a signal cable.

15. The display apparatus according to claim 14, wherein the LVDS cable extends through the first through hole via the body part of the hinge.

16. The display apparatus according to claim 14, wherein the stand neck cover further includes an opening through which at least one of a power cable and a signal cable extend.

17. The display apparatus according to claim 14, wherein the power board and the signal board of the main board are connected via a cable.

18. The display apparatus according to claim 17, wherein a power cable and a signal cable are connected to the power board and the signal board, respectively.

19. The display apparatus according to claim 14, wherein the main base includes a fan, and the fan is connected to the power board of the main board via a cable.

20. The display apparatus according to claim 14, wherein the function keyboard is connected to the power board of the main board via a cable.

* * * * *